United States Patent
Fletcher et al.

(10) Patent No.: US 7,058,482 B2
(45) Date of Patent: Jun. 6, 2006

(54) DATA SAMPLE AND TRANSMISSION MODULES FOR POWER DISTRIBUTION SYSTEMS

(75) Inventors: David G. Fletcher, Simsbury, CT (US); Thomas F. Papallo, Farmington, CT (US); John J. Dougherty, Collegeville, PA (US); Ertugrul Berkcan, Clifton Park, NY (US); Emad Andarawis Andarawis, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 10/373,680

(22) Filed: Feb. 25, 2003

(65) Prior Publication Data

US 2003/0212515 A1 Nov. 13, 2003

Related U.S. Application Data

(60) Provisional application No. 60/359,544, filed on Feb. 25, 2002, and provisional application No. 60/438,159, filed on Jan. 6, 2003.

(51) Int. Cl.
*G06F 19/00* (2006.01)

(52) U.S. Cl. .......................... 700/292; 700/296; 702/60
(58) Field of Classification Search ................. 700/286, 700/292, 293, 296; 702/60, 62
See application file for complete search history.

(56) References Cited

U.S. PATENT DOCUMENTS

| | | | |
|---|---|---|---|
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |
| 4,352,138 A | * 9/1982 | Gilker ......................... | 361/92 |
| 4,415,968 A | 11/1983 | Maeda et al. | |
| 4,423,459 A | 12/1983 | Stich et al. | |
| 4,432,031 A | 2/1984 | Premerlani | |
| 4,455,612 A | 6/1984 | Girgis et al. | |
| 4,468,714 A | 8/1984 | Russell | |
| 4,589,074 A | 5/1986 | Thomas et al. | |
| 4,623,949 A | 11/1986 | Salowe et al. | |
| 4,631,625 A | 12/1986 | Alexander et al. | |
| 4,642,724 A | 2/1987 | Ruta | |
| 4,652,966 A | 3/1987 | Farag et al. | |
| 4,672,501 A | 6/1987 | Bilac et al. | |
| 4,672,555 A | 6/1987 | Hart et al. | |

(Continued)

FOREIGN PATENT DOCUMENTS

| | | |
|---|---|---|
| EP | 0718948 A2 | 6/1996 |
| EP | 0723325 A1 | 7/1996 |
| EP | 0949734 A2 | 10/1999 |

OTHER PUBLICATIONS

Atanackovic D. et al. An Integrated Knowledge–Based Model For Power–System Planning IEEE Expert, IEEE Inc. New York, Jul. 1997; pp. 65–71.

*Primary Examiner*—Jayprakash N. Gandhi
(74) *Attorney, Agent, or Firm*—Orlandt, Greeley, Ruggiero & Perle, L.L.P.

(57) ABSTRACT

A data sample and transmission module for a power distribution system is provided. The module has a microprocessor and a network interface. The microprocessor samples first signals indicative of a condition of power in the power distribution system. The network interface places the microprocessor in communication with a data network. The microprocessor samples the first signals based in part upon a synchronization signal transmitted on the data network.

24 Claims, 5 Drawing Sheets

U.S. PATENT DOCUMENTS

| | | | |
|---|---|---|---|
| 4,674,062 A | 6/1987 | Premerlani | |
| 4,689,712 A | 8/1987 | Demeyer | |
| 4,709,339 A | 11/1987 | Fernandes | |
| 4,751,653 A | 6/1988 | Junk et al. | |
| 4,752,853 A | 6/1988 | Matsko et al. | |
| 4,754,407 A | 6/1988 | Nolan | |
| 4,777,607 A | 10/1988 | Maury et al. | |
| 4,783,748 A | 11/1988 | Swarztrauber et al. | |
| 4,796,027 A | 1/1989 | Smith-Vaniz | |
| 4,833,592 A | 5/1989 | Yamanaka | |
| 4,849,848 A | 7/1989 | Ishii | |
| 4,855,671 A | 8/1989 | Fernandes | |
| 4,862,308 A | 8/1989 | Udren | |
| 4,964,058 A | 10/1990 | Brown, Jr. | |
| 4,979,122 A | 12/1990 | Davis et al. | |
| 4,983,955 A | 1/1991 | Ham, Jr. et al. | |
| 4,996,646 A | 2/1991 | Farrington | |
| 5,053,735 A | 10/1991 | Ohishi et al. | |
| 5,060,166 A | 10/1991 | Engel et al. | |
| 5,101,191 A | 3/1992 | MacFadyen et al. | |
| 5,134,691 A | 7/1992 | Elms | |
| 5,136,458 A | 8/1992 | Durivage, III | |
| 5,162,664 A * | 11/1992 | Haun et al. | 307/64 |
| 5,166,887 A | 11/1992 | Farrington et al. | |
| 5,170,310 A | 12/1992 | Studtmann et al. | |
| 5,170,360 A | 12/1992 | Porter et al. | |
| 5,179,376 A | 1/1993 | Pomatto | |
| 5,182,547 A | 1/1993 | Griffith | |
| 5,185,705 A | 2/1993 | Farrington | |
| 5,196,831 A | 3/1993 | Bscheider | |
| 5,214,560 A | 5/1993 | Jensen | |
| 5,216,621 A | 6/1993 | Dickens | |
| 5,225,994 A | 7/1993 | Arinobu et al. | |
| 5,231,565 A | 7/1993 | Bilas et al. | |
| 5,237,511 A | 8/1993 | Caird et al. | |
| 5,247,454 A | 9/1993 | Farrington et al. | |
| 5,253,159 A | 10/1993 | Bilas et al. | |
| 5,272,438 A | 12/1993 | Stumme | |
| 5,301,121 A | 4/1994 | Garverick et al. | |
| 5,305,174 A | 4/1994 | Morita et al. | |
| 5,311,392 A | 5/1994 | Kinney et al. | |
| 5,323,307 A | 6/1994 | Wolf et al. | |
| 5,353,188 A | 10/1994 | Hatakeyama | |
| 5,361,184 A | 11/1994 | El-Sharkawi et al. | |
| 5,367,427 A | 11/1994 | Matsko et al. | |
| 5,369,356 A | 11/1994 | Kinney et al. | |
| 5,381,554 A | 1/1995 | Langer et al. | |
| 5,384,712 A | 1/1995 | Oravetz et al. | |
| 5,402,299 A | 3/1995 | Bellei | |
| 5,406,495 A | 4/1995 | Hill | |
| 5,414,635 A | 5/1995 | Ohta | |
| 5,420,799 A | 5/1995 | Peterson et al. | |
| 5,422,778 A | 6/1995 | Good et al. | |
| 5,440,441 A | 8/1995 | Ahuja | |
| 5,451,879 A | 9/1995 | Moore | |
| 5,487,016 A | 1/1996 | Elms | |
| 5,490,086 A | 2/1996 | Leone et al. | |
| 5,493,468 A | 2/1996 | Hunter et al. | |
| 5,530,738 A | 6/1996 | McEachern | |
| 5,534,782 A | 7/1996 | Nourse | |
| 5,534,833 A | 7/1996 | Castonguay et al. | |
| 5,537,327 A | 7/1996 | Snow et al. | |
| 5,544,065 A | 8/1996 | Engel et al. | |
| 5,559,719 A | 9/1996 | Johnson et al. | |
| 5,560,022 A | 9/1996 | Dunstan et al. | |
| 5,576,625 A | 11/1996 | Sukegawa et al. | |
| 5,581,471 A | 12/1996 | McEachern et al. | |
| 5,587,917 A | 12/1996 | Elms | |
| 5,596,473 A | 1/1997 | Johnson et al. | |
| 5,600,527 A | 2/1997 | Engel et al. | |
| 5,608,646 A | 3/1997 | Pomatto | |
| 5,613,798 A | 3/1997 | Braverman | |
| 5,619,392 A | 4/1997 | Bertsch et al. | |
| 5,627,716 A | 5/1997 | Lagree et al. | |
| 5,627,717 A | 5/1997 | Pein et al. | |
| 5,627,718 A | 5/1997 | Engel et al. | |
| 5,629,825 A | 5/1997 | Wallis et al. | |
| 5,631,798 A | 5/1997 | Seymour et al. | |
| 5,638,296 A | 6/1997 | Johnson et al. | |
| 5,650,936 A | 7/1997 | Loucks et al. | |
| 5,661,658 A | 8/1997 | Putt et al. | |
| 5,666,256 A | 9/1997 | Zavis et al. | |
| 5,670,923 A | 9/1997 | Gonzalez et al. | |
| 5,694,329 A | 12/1997 | Pomatto | |
| 5,696,695 A | 12/1997 | Ehlers et al. | |
| 5,719,738 A | 2/1998 | Singer et al. | |
| 5,734,576 A | 3/1998 | Klancher | |
| 5,736,847 A | 4/1998 | Van Doorn et al. | |
| 5,737,231 A | 4/1998 | Pyle et al. | |
| 5,742,513 A | 4/1998 | Bouhenguel et al. | |
| 5,751,524 A | 5/1998 | Swindler | |
| 5,754,033 A | 5/1998 | Thomson | |
| 5,754,440 A | 5/1998 | Cox et al. | |
| 5,768,148 A | 6/1998 | Murphy et al. | |
| 5,784,237 A | 7/1998 | Velez | |
| 5,784,243 A | 7/1998 | Pollman et al. | |
| 5,786,699 A | 7/1998 | Sukegawa et al. | |
| 5,812,389 A | 9/1998 | Katayama et al. | |
| 5,821,704 A | 10/1998 | Carson et al. | |
| 5,825,643 A | 10/1998 | Dvorak et al. | |
| 5,828,576 A | 10/1998 | Loucks et al. | |
| 5,828,983 A | 10/1998 | Lombardi | |
| 5,831,428 A | 11/1998 | Pyle et al. | |
| 5,867,385 A | 2/1999 | Brown et al. | |
| 5,872,722 A | 2/1999 | Oravetz et al. | |
| 5,872,785 A | 2/1999 | Kienberger | |
| 5,890,097 A | 3/1999 | Cox | |
| 5,892,449 A | 4/1999 | Reid et al. | |
| 5,903,426 A | 5/1999 | Ehling | |
| 5,905,616 A | 5/1999 | Lyke | |
| 5,906,271 A | 5/1999 | Castonguay et al. | |
| 5,926,089 A | 7/1999 | Sekiguchi et al. | |
| 5,936,817 A | 8/1999 | Matsko et al. | |
| 5,946,210 A | 8/1999 | Montminy et al. | |
| 5,958,060 A | 9/1999 | Premerlani | |
| 5,963,457 A | 10/1999 | Kanoi et al. | |
| 5,973,481 A | 10/1999 | Thompson et al. | |
| 5,973,899 A | 10/1999 | Williams et al. | |
| 5,982,595 A | 11/1999 | Pozzuoli | |
| 5,982,596 A | 11/1999 | Spencer et al. | |
| 5,995,911 A | 11/1999 | Hart | |
| 6,005,757 A | 12/1999 | Shvach et al. | |
| 6,005,758 A | 12/1999 | Spencer et al. | |
| 6,018,451 A | 1/2000 | Lyke et al. | |
| 6,038,516 A | 3/2000 | Alexander et al. | |
| 6,047,321 A | 4/2000 | Raab et al. | |
| 6,054,661 A | 4/2000 | Castonguay et al. | |
| 6,055,145 A | 4/2000 | Lagree et al. | |
| 6,061,609 A | 5/2000 | Kanoi et al. | |
| 6,084,758 A | 7/2000 | Clarey et al. | |
| 6,138,241 A | 10/2000 | Eckel et al. | |
| 6,139,327 A | 10/2000 | Callahan et al. | |
| 6,141,196 A | 10/2000 | Premerlani et al. | |
| 6,157,527 A | 12/2000 | Spencer et al. | |
| 6,167,329 A | 12/2000 | Engel et al. | |
| 6,175,780 B1 | 1/2001 | Engel | |
| 6,185,482 B1 | 2/2001 | Egolf et al. | |
| 6,185,508 B1 | 2/2001 | Van Doorn et al. | |
| 6,186,842 B1 | 2/2001 | Hirschbold et al. | |
| 6,195,243 B1 | 2/2001 | Spencer et al. | |
| 6,198,402 B1 | 3/2001 | Hasegawa et al. | |

| Patent No. | Date | Inventor |
|---|---|---|
| 6,212,049 B1 | 4/2001 | Spencer et al. |
| 6,222,714 B1 * | 4/2001 | Hoffman .................... 361/93.2 |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | Criniti et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,295,190 B1 * | 9/2001 | Rinaldi et al. .............. 361/115 |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Anderson |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 6,714,148 B1 * | 3/2004 | Saga et al. .................. 341/126 |
| 2001/0010032 A1 | 7/2001 | Ehlers, et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osbum, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |
| 2004/0133367 A1 * | 7/2004 | Hart ........................... 702/57 |

* cited by examiner

DATA SAMPLE AND TRANSMISSION MODULES FOR POWER DISTRIBUTION SYSTEMS

CROSS REFERENCE TO RELATED APPLICATIONS

This application is related to U.S. patent application No. 60/359,544 filed on Feb. 25, 2002 for "Integrated Protection, Monitoring, and Control" the contents of which are incorporated by reference herein. This application is also related to U.S. Patent Application No. 60/438,159 filed on Jan. 6, 2003 for "Single Processor Concept for Protection and Control of Circuit Breakers in Low-Voltage Switchgear" the contents of which are incorporated by reference herein.

BACKGROUND OF THE INVENTION

The present disclosure relates generally to power distribution systems. More particularly, the present disclosure relates to data sample and transmission modules that allow the power distribution system to be centrally controlled.

Industrial power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined overcurrent without damage to itself when properly applied within its rating. Since this automatic protection is based on conditions of the power (e.g., current), suppliers of circuit breakers have commonly made a large range circuit breakers to meet the various current demands, which can create inventory problems.

The inventory issue is made even more complex by the supplementary protectors that are often enclosed within the molded body of the circuit breaker. One common type of supplementary protector is known as an electronic trip unit. Electronic trip units typically include an analog-to-digital converter and a microprocessor. The electronic trip units receive signals from one or more sensors, such as, current transformers (CT's) and/or potential transformers (PT's). The sensors monitor a condition of the incoming power and provide an analog signal of the condition to the analog-to-digital converter. The A/D converter converts the analog signals from the sensors into digital signals, and provides the digital signals to the microprocessor. The microprocessor operates one or more control algorithms that provide the desired protection, monitoring, and control features.

The cost of each circuit breaker increases as the processing power of each microprocessor in its electronic trip unit increases. Namely, the cost of each circuit breaker increases as the complexity and number of protection features in the electronic trip unit is increased. Accordingly, suppliers of circuit breakers have also commonly manufactured a large range electronic trip units in the circuit breakers to meet the various consumer performance and price demands.

The large number of circuit breaker/trip unit combinations also adds cost and delay to the design and installation of the power distribution system. Moreover, it can increase the cost and delay associated with upgrading existing systems.

Accordingly, there is a continuing need for power distribution systems having low cost, easy to install components that provide the desired increased protection systems. It is also desired for such low cost components to ensure basic over-current protection in the event that other aspects of the protection fail.

SUMMARY OF THE INVENTION

In one exemplary embodiment, a data sample and transmission module for a power distribution system is provided. The module has a microprocessor and a network interface. The microprocessor samples first signals indicative of a condition of power in the power distribution system. The network interface places the microprocessor in communication with a data network. The microprocessor samples the first signals based in part upon a synchronization signal transmitted on the data network.

In another exemplary embodiment, the data sample and transmission module has a microprocessor and a network interface. The microprocessor samples a power condition signal from a circuit in the power distribution system. The network interface places the microprocessor in communication with a central processor so that the microprocessor can send a first message containing the power condition signal to the central processor and can receive a second message and a synchronization pulse from the central processor. The microprocessor samples the power condition signal based in part upon the synchronization pulse. The module can operate a circuit breaker in the power distribution system in response to the second message and can operate the circuit breaker in response to the power condition signal independent of the second message.

In yet another exemplary embodiment, a protection system for a power distribution system is provided. The protection system includes a first circuit breaker in communication with a first module, a second circuit breaker in communication with a second module, and a central processor. The central processor is in communication with the first and second modules so that the central processor can send a synchronization signal to the first and second modules. The first module samples a first power condition at the first circuit breaker and sends the first power condition to the central processor based in part upon the synchronization signal. Similarly, the second module samples a second power condition at the second circuit breaker and sends the second power condition to the central processor based in part upon the synchronization signal. The central processor controls the first circuit breaker based on the first power condition, the second circuit breaker based on the second power condition, and combinations thereof.

The above-described and other features and advantages of the present disclosure will be appreciated and understood by those skilled in the art from the following detailed description, drawings, and appended claims.

DETAILED DESCRIPTION

Figure 1:
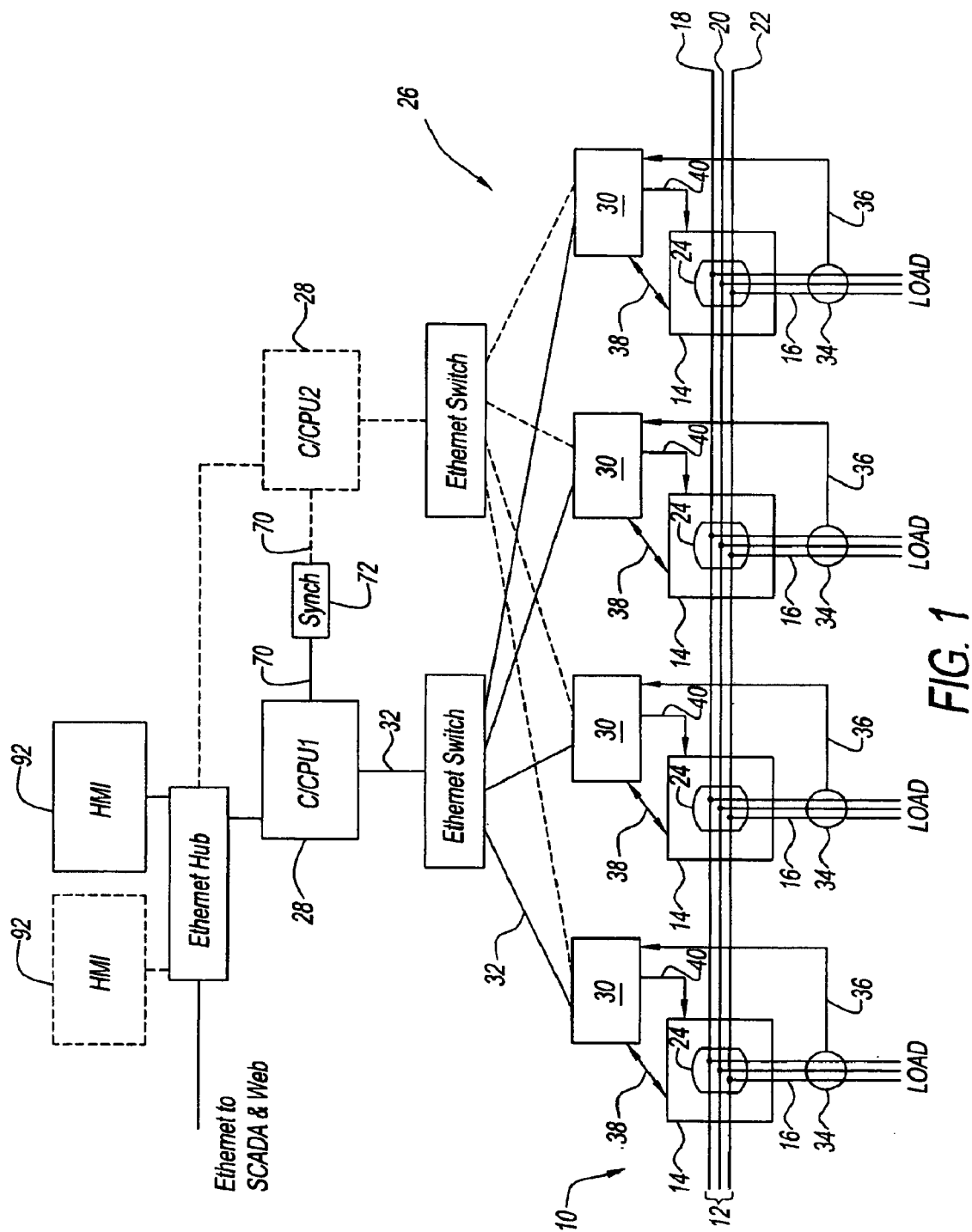
FIG. 1 is a schematic of an exemplary embodiment of a power distribution system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), sort time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
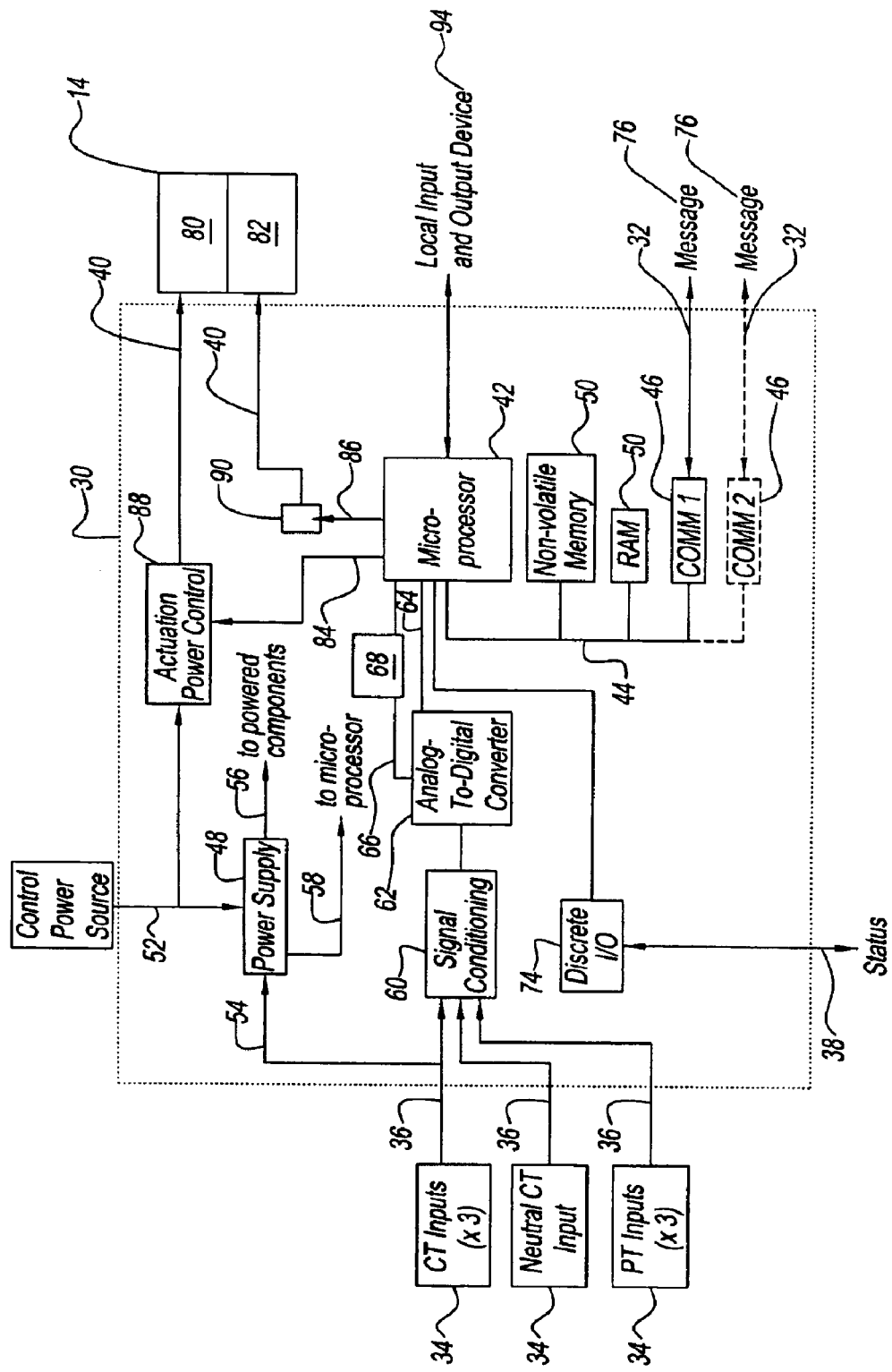
FIG. 2 is a schematic of an exemplary embodiment of a data sample and transmission module having an analog backup system.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

It has been realized that CCPU 28 may be unable to control breakers 14 under some conditions. These conditions may include power outages in first source 52, initial startup of CCPU 28, failure of network 32, and others. Under these failure conditions, system 26 includes one or more backup systems to ensure that at least some protection is provided to circuit breaker 14.

Figure 3:
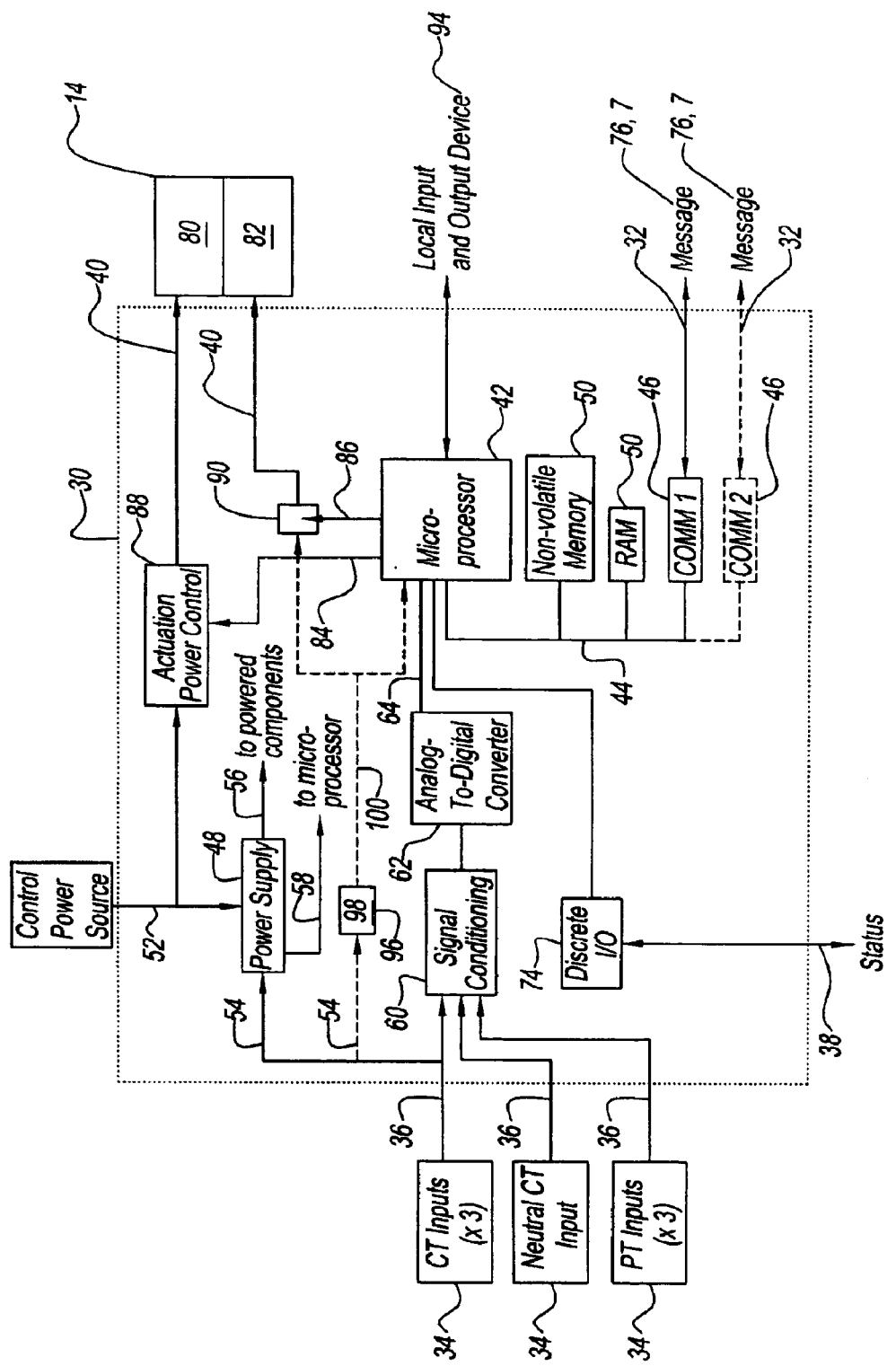
FIG. 3 is a schematic of the module of FIG. 2 having an exemplary embodiment of an analog backup system.

An exemplary embodiment of an analog backup system 96 is illustrated in FIG. 3, where some components of module 30 are omitted for purposes of clarity. Analog backup system 96 is an analog circuit 98 configured to operate circuit breaker 14 for selected fault conditions, even if system 26 is otherwise inoperative. Additionally, analog backup system 96 is powered from the secondary current available from sensors 34 (i.e., current transformers). Since analog backup system 96 is powered by second source 54, it can operate even in the absence of first source 52.

Analog circuit 98 receives the secondary current (e.g., second source 54) from sensors 34 and is configured to determine if an instantaneous over-current (IOC) fault is present in circuit 16. When analog circuit 98 determines that the IOC fault is present, the circuit provides a third output 100 to gating circuit 90 to operate solenoid 82. Third output 100 instructs gating circuit 90 to provide third signal 40 to solenoid 82 (i.e., flux shifter), which can separate contacts 24. In this manner, module 30 can operate circuit breaker 14 independent of the operational condition of system 26 and/or first source 52.

Analog backup system 96 can operate simultaneously with system 26 when the system is operational. In this embodiment, analog circuit 98 can also provide third output 100 to microprocessor 42 to notify the microprocessor of the fault condition.

Figure 4:
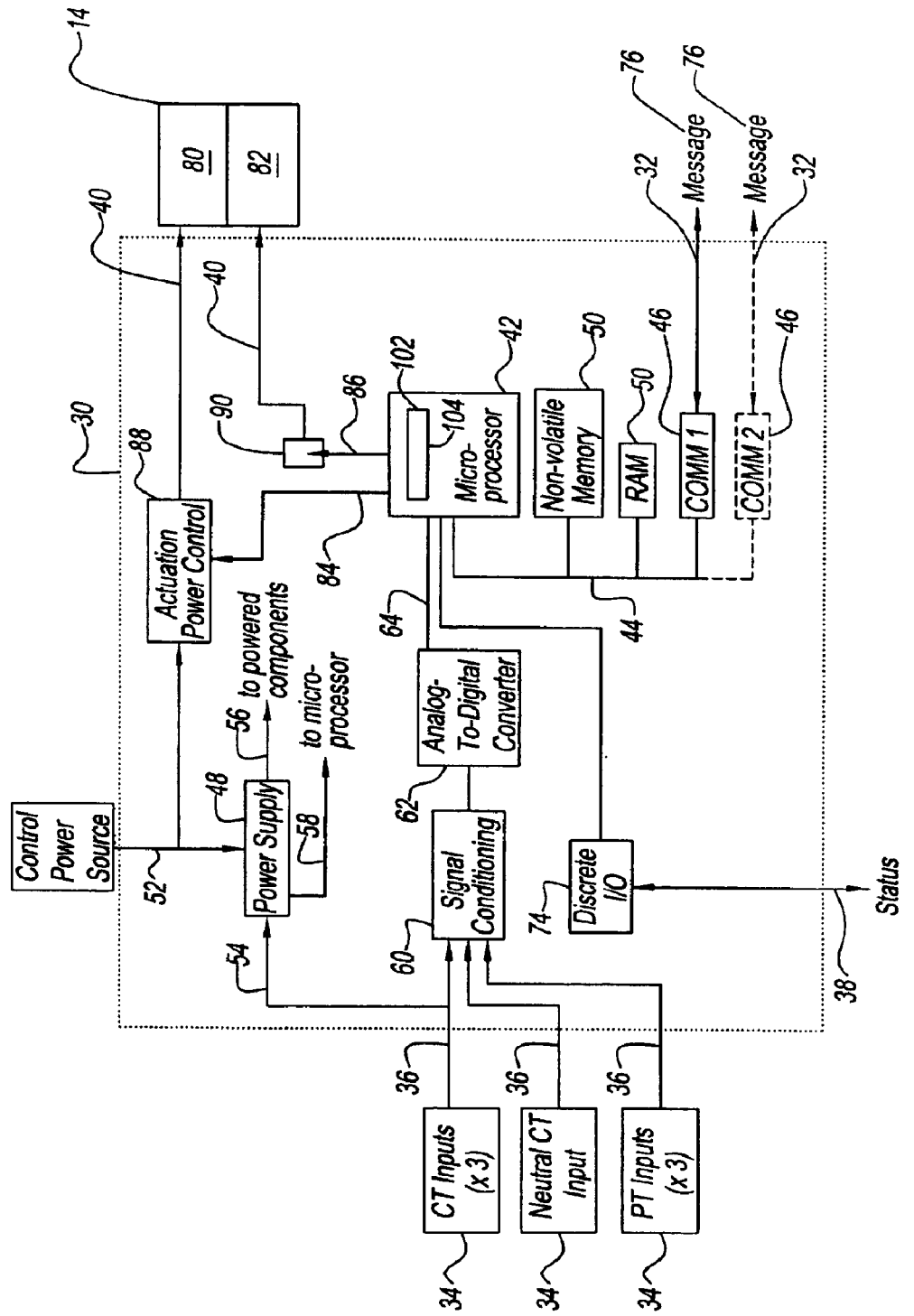
FIG. 4 is a schematic of the module of FIG. 2 having an exemplary embodiment of a digital backup system.

An exemplary embodiment of a digital backup system 102 is illustrated in FIG. 4. Digital backup system 102 can also operate circuit breaker 14 even if portions of system 26 are otherwise inoperative.

Digital backup system 102 includes microprocessor 42 and a back-up algorithm 104, which is resident on the microprocessor. Backup system 102 is configured to modify operation of microprocessor 42 to coordinate its power usage with power available from power supply 48. For example, microprocessor 42 receives fourth signal 58 from power supply 48. Again, fourth signal 58 is indicative of whether power supply 48 is receiving power from first source 52, second source 54, or both of the first and second sources.

Microprocessor 42 operates normally when fourth signal 58 indicates that power supply 48 is receiving power from first source 52 or from both first and second sources 52, 54. Under normal operation of microprocessor 42, system 26 is operational and requires the power available from first source 52.

However, backup system 102 can control microprocessor 42 to operate only algorithm 104 when fourth signal 58 indicates that power supply 48 is receiving power from only second source 54. Algorithm 104 is configured to operate with the power available from second source 54. For example, algorithm 104 can be a short time over-current algorithm, a long time over-current algorithm, and any combination thereof.

In the event algorithm 104 determines that a fault condition is present in circuit 16, microprocessor 42 sends second output 86 to operate solenoid 82. Again, second output 86 instructs gating circuit 90 to provide third signal 40 to solenoid 82, which can separate contacts 24. In this manner, digital backup system 102 can operate circuit breaker 14 in response to first and second signals 36, 38 independent of the operation status of system 26.

Digital backup system 102 can also be configured to reduce power consumed by microprocessor 42 by other methods alone or in conjunction with algorithm 104. For example, backup system 102 can reduce the power consumed by microprocessor 42 by slowing the clock speed of the microprocessor. Backup system 102 can also reduce the power consumed by microprocessor 42 by shutting off power 56 to internal and/or external peripherals, such as network interface 46, memory devices 50, local input and/or output devices 94, and others.

Accordingly, digital backup system 102 is adapted to operate circuit breaker 14 even if portions of system 26 are otherwise inoperative.

Figure 5:
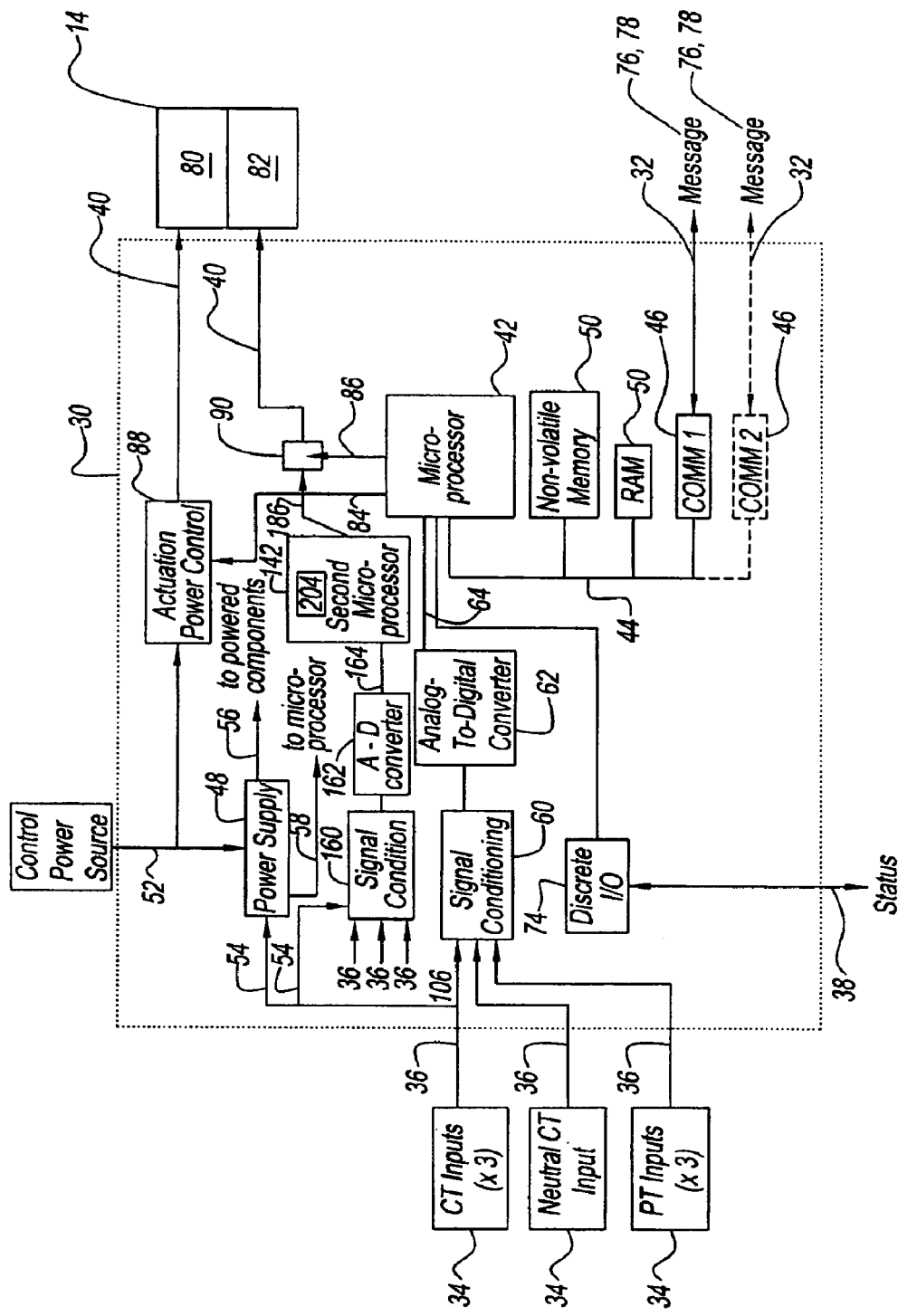
FIG. 5 is a schematic of the module of FIG. 2 having an alternate exemplary embodiment of a digital backup system.

An alternate embodiment of a digital backup system 106 is illustrated in FIG. 5. Digital backup system 106 has a second microprocessor 142, a signal conditioner 160, a second analog-digital converter 162, and an over-current protection algorithm 204, which is resident on the second microprocessor.

Power supply 48 provides power 56 to second microprocessor 142. Since second microprocessor 142 is running only algorithm 204, the second microprocessor can operate with the power available from second source 54. For example, algorithm 204 can be a short time over-current algorithm, a long time over-current algorithm, and any combination thereof.

In use, first signals 36 are conditioned by signal conditioner 160 and converted to digital signals 164 by A/D converter 162. Thus, digital backup system 106 collects first signals 36 and presents digital signals 164, representative of the raw data in the first signals, to microprocessor 142.

In the event algorithm 204 determines that a fault condition is present in circuit 16, microprocessor 142 sends a second output 186 to operate solenoid 82. Second output 186, much like second output 86 discussed above, instructs gating circuit 90 to provide third signal 40 to solenoid 82, which can separate contacts 24. In this manner, digital backup system 106 can operate circuit breaker 14 independent of the operational status of system 26.

The various exemplary embodiments of the backup systems are illustrated above for purposes of clarity exclusive of one another. However, it is contemplated by the present disclosure for system 26 have any combination of one or more of analog and digital backup systems 96, 102, 106.

Accordingly, each module 30 can control circuit breaker 14 based on second messages 78 from CCPU 28 (i.e., remote control) and can control the circuit breaker locally via one or more of the backup devices 96, 102, 106.

Advantageously, power distribution system 10 having system 26 provides multiple redundant levels of protection. One level of protection is provided by circuit breaker 14, which can open its separable contacts 24 automatically upon detection of an instantaneous over-current fault in circuit 16.

Other, higher levels of protection and monitoring are provided by system 26. CCPU 28 provides high level protection and monitoring based on the data transmitted across network 32 from modules 30. In addition, system 26 can include redundant CCPU's 28 and networks 32 communication with each module 30 to ensure the high level system protection and monitoring in the event of a failure of one of the redundant communication systems.

Finally, system 26 provides backup protection to power distribution system 10 by way of backup devices 96, 102, 106. In the event of a partial failure of certain portions of system 26, the backup devices can open separable contacts 24 of circuit breaker 14 upon detection of select fault conditions in circuit 16.

Moreover, system 26 provides these multiple protection redundancies without requiring the high cost, high complexity trip units of prior designs. Further, system 26 provides these multiple protection redundancies in system that is easy to install, design, and upgrade.

It should also be noted that the terms "first", "second", "third", "upper", "lower", and the like may be used herein to modify various elements. These modifiers do not imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A data sample and transmission module for a power distribution system, comprising:

a microprocessor for sampling one or more first signals indicative of a condition of power in the power distribution system;

a phase-lock-loop algorithm resident on said microprocessor; and a network interface for placing said microprocessor in communication with a data network, said microprocessor sampling said one or more first signals based upon said phase-lock-loop algorithm as adjusted by a synchronization signal transmitted on said data network.

2. The module as in claim 1, wherein said microprocessor is configured to receive one or more second signals indicative of a condition of a circuit breaker in the power distribution system.

3. The module as in claim 1, further comprising a power supply providing power to said microprocessor, said power supply receiving said power from a first source, a second source, or a combination thereof.

4. The module as in claim 3, wherein said power supply provides a third signal to said microprocessor, said third signal being indicative of whether said power supply is receiving said power from said first source, said second source, or said combination.

5. A data sample and transmission module for a power distribution system, comprising:

a microprocessor for sampling one or more first signals indicative of a condition of power in the power distribution system; and a network interface for placing said microprocessor in communication with a data network, said microprocessor sampling said one or more first signals based in part upon a synchronization signal transmitted on said data network, wherein said microprocessor is configured to combine said one or more first signals as raw parametric data in a first message and to send said first message over said data network.

6. The module as in claim 5, wherein said microprocessor operates a circuit breaker in the power distribution system in response to a second message receivable from the data network.

7. The module as in claim 6, further comprising a backup system for operating said circuit breaker based on said one or more first signals independent of said second message.

8. The module as in claim 7, wherein said backup system comprises an analog circuit, said analog circuit receiving said one or more first signals and generating an output based on said one or more first signals, said output being configured to operate said circuit breaker.

9. The module as in claim 7, further comprising a power supply providing power and a third signal to said microprocessor, said power supply receiving said power from a first source, a second source, or a combination thereof, said third signal being indicative of whether said power supply is receiving said power from said first source, said second source, or said combination.

10. The module as in claim 9, wherein said backup system comprises an algorithm resident on said microprocessor, said microprocessor processing said one or more first signals using said algorithm when said third signal indicates said power supply is receiving said power only from said second source, said algorithm generating an output based on said one or more first signals, said output being configured to operate said circuit breaker.

11. The module as in claim 7, wherein said backup system comprises a second microprocessor having an algorithm resident thereon, said algorithm generating an output based on said one or more first signals, said output being configured to operate said circuit breaker.

12. A data sample and transmission module for a power distribution system, comprising:

a microprocessor for sampling a power condition signal from a circuit in the power distribution system;

a network interface placing said microprocessor in communication with a central processor so that said microprocessor can send a first message containing said power condition signal to said central processor and can receive a second message and a synchronization pulse from said central processor, said microprocessor sampling said power condition signal based in part upon said synchronization pulse;

means for operating a circuit breaker in the power distribution system in response to said second message; and means for operating said circuit breaker in response to said power condition signal independent of said second message.

13. The module as in claim 12, wherein said means for operating said circuit breaker independent of said second message comprises an analog circuit, said analog circuit receiving said power condition signal and generating an output based on said power condition signal, said output being configured to operate said circuit breaker.

14. The module as in claim 12, wherein said means for operating said circuit breaker independent of said second message comprises an algorithm resident on said microprocessor, said algorithm generating an output based on said power condition signal, said output being configured to operate said circuit breaker.

15. The module as in claim 12, wherein said means for operating said circuit breaker independent of said second message comprises a second microprocessor having an algorithm resident thereon, said second microprocessor receiving said power condition signal so that said algorithm can generate an output based on said power condition signal, said output being configured to operate said circuit breaker.

16. The module as in claim 12, further comprising a phase-lock-loop algorithm resident on said microprocessor, wherein said microprocessor samples said power condition signal based upon said phase-lock-loop algorithm as adjusted by said synchronization pulse.

17. The module as in claim 12, wherein said first message comprises raw parametric data of said power condition signal.

18. A protection system for a power distribution system, comprising:

a first circuit breaker in communication with a first module;

a second circuit breaker in communication with a second module; and a central processor in communication with said first and second modules so that said central processor can send a synchronization signal to said first and second modules, said first module sampling a first power condition at said first circuit breaker based in part upon said synchronization signal, said first module sending said first power condition to said central processor, said second module sampling a second power condition at said second circuit breaker based in part upon said synchronization signal, and said second module sending said second power condition to said central processor, wherein said central processor is configured to control said first circuit breaker based on said first power condition, said second circuit breaker based on said second power condition, and combinations thereof.

19. The protection system as in claim 18, wherein said first module further comprises a backup system for locally operating said first circuit breaker based on said first power condition independent of said central processor.

20. The protection system as in claim 19, wherein said backup system comprises an analog circuit receiving said first power condition and generating an output based on said first power condition signal, said output being configured to operate said first circuit breaker.

21. The protection system as in claim 19, wherein said backup system comprises an algorithm resident on said microprocessor, said algorithm generating an output based on said first power condition signal, said output being configured to operate said first circuit breaker.

22. The protection system as in claim 19, wherein said backup system comprises a second microprocessor having an algorithm resident thereon, said algorithm generating an output based on said first power condition signal, said output being configured to operate said first circuit breaker.

23. The protection system as in claim 18, further comprising a phase-lock-loop algorithm resident on each of said first and second modules, wherein said first module samples said first power condition signal based upon said phase-lock-loop algorithm as adjusted by said synchronization signal and said second module samples said second power condition signal based upon said phase-lock-loop algorithm as adjusted by said synchronization signal.

24. The protection system as in claim 18, wherein said first power condition sent to said central processor by said first module comprises raw parametric data of said first power condition at said first circuit breaker and said second power condition sent to said central processor by said second module comprises raw parametric data of said second power condition at said second circuit breaker.

* * * * *